April 6, 1948. T. A. TE GROTENHUIS 2,438,952
METHOD FOR CURING PNEUMATIC TIRES
Filed April 20, 1944 5 Sheets-Sheet 1

INVENTOR.
Theodore A. TeGrotenhuis
BY
Evans + McCoy
ATTORNEYS

April 6, 1948.    T. A. TE GROTENHUIS    2,438,952
METHOD FOR CURING PNEUMATIC TIRES
Filed April 20, 1944    5 Sheets-Sheet 4

INVENTOR.
Theodore A. TeGrotenhuis
BY
Evans + McCoy
ATTORNEYS

April 6, 1948.　　T. A. TE GROTENHUIS　　2,438,952
METHOD FOR CURING PNEUMATIC TIRES
Filed April 20, 1944　　5 Sheets-Sheet 5

INVENTOR.
Theodore A. Te Grotenhuis
BY
Evans + McCoy
ATTORNEYS

Patented Apr. 6, 1948

2,438,952

UNITED STATES PATENT OFFICE 2,438,952

METHOD FOR CURING PNEUMATIC TIRES

Theodore A. Te Grotenhuis, Olmsted Falls, Ohio, assignor to The General Tire & Rubber Company, Akron, Ohio, a corporation of Ohio Application April 20, 1944, Serial No. 531,920

19 Claims. (Cl. 18—53)

This invention relates to a method for making pneumatic tires. It particularly relates to a method of curing pneumatic tires wherein heat is formed internally thereof by rapid change in electrical stress in the dielectric.

That high voltage and high frequency oscillations rapidly heat dielectrics, including rubber, wood, glass, plastics and other non-conductors, has long been known to manufacturers of electrical condensers, cable and the like, and in the design of condensers, cable and other apparatus adapted to operate under relatively high frequency conditions provision is always made to decrease the stress in the dielectric so that such heat developed is dissipated by conduction and is not built up to destructive values.

It has heretofore been proposed to utilize heat thus generated to cause curing of rubber, polymerization and/or setting of thermoplastic or thermosetting resins and since the designing and building of high frequency generators of substantial capacity has made such heat less expensive, relatively wide commercial use of high frequency and high voltage equipment to form heat through relatively thick or relatively non-conductive materials has taken place. The use of high frequency to cause heating of rubber is advantageous over the application of heat externally because the heat may be formed substantially uniformly throughout the article, i. e., the heat generated in the center of an article subjected to uniform electric field is just as great as the heat generated at the edges, whereas when heat is applied from the outside of relatively thick, non-conductive materials, such as solid dielectrics, a relatively long interval of time elapses before the temperature of the center of the article becomes equal to the temperature at the side edges thereof.

Even though the advantages of high frequency curing of pneumatic tires has long been apparent, as far as I am aware, it has not been successfully accomplished for the reason that pneumatic tires cannot usually be preheated externally of the mold as can rubber stock for mechanical goods, as separation between splices of the tread or plies usually occurs. The presence of metallic beads, the non-uniform thickness of the article, and the requirement of stretchable air bags has heretofore prevented the application of high frequency current in the mold.

Because of the relatively slow penetration of heat from external surfaces into the rubber, relatively slow accelerators with relatively flat curing curves have necessarily been used substantially exclusively, as otherwise extreme variation in degree of cure in different parts of the tire casing occurred.

It is another object to provide a method of independently and relatively varying the state of cure of different portions of a tire.

It is another object to provide a system for curing pneumatic tires wherein high frequency electrical energy is utilized to form heat within the rubberlike material.

It is another object of the present invention to provide a method for curing pneumatic tires utilizing vulcanizable rubberlike material, wherein rapidly acting accelerators may be used to reduce the curing time without causing substantial overcuring of portions of the tire.

It is another object to provide a method of rapidly heating uncured pneumatic tires throughout their cross section while they are disposed within a shaping mold and under the influence of fluid pressure.

It is a further object to provide a method of curing pneumatic tire casings wherein a rapid change in dielectric stress occasioned by the use of a relatively strong high frequency field, is utilized in addition to heat externally applied to cause more rapid curing, thereby eliminating a major portion of the curing time heretofore required.

Other objects will be apparent from the following detail description of the invention as illustrated by the accompanying drawings, where like parts are designated by like numerals of reference throughout the several views, in which.

In accordance with the present invention, the portions of the tire having variable thicknesses are treated with differing amounts of high frequency electrical energy per unit of surface to form the desired amount of internal heat for curing of the vulcanizable rubber or rubbery composition of the tire. It is found that especially desirable results are had when use is made of relatively highly conductive soft rubber compositions to more evenly distribute the high frequency electric field to the desired portions of the tire casing and to increase the uniformity of heat throughout the tire. Internal heat, provided by rapid change of electrical stress in the dielectric, is preferably supplemented by external heat supplied to at least one or both of the surfaces with which the tire is brought in contact.

In accordance with the present invention, the dissipation of different amounts per unit of surface area of high frequency electrical energy as heat in separate portions of the tire casing (having stress resisting elements such as cords, fabrics, etc., to be adhered through one or more vulcanizable elastomers or rubbery polymers or condensation products including those rubbery materials hereinafter set forth) may be had by varying the spacing between the conductive surfaces of the mold or of the air bag from portions of the inner and outer surfaces of the tire casing, or by providing a plurality of separately insulated, annular conductive elements or surfaces on either one or both sides of the tire casing. Thus, if a single conductive layer is utilized in the air bag, portions thereof may be spaced at greater distances from the thinner portions of the side walls of the tire than from the inner surfaces of the tire adjacent the shoulder portions, or portions of the conductive surface of the mold may be spaced at varying distances from the face of the nearest surface of the tire casing so as to provide a more uniform field and hence uniform heating throughout.

When separately insulated annular conductive surface portions are utilized on one or both sides of the tire, a high frequency electrical energy, either of the same or different potentials, is applied between selected, oppositely disposed surfaces to cause the dissipation of increased quantities of energy (per unit of surface area parallel to the outer surface of the air bag) in the thicker portions of the tire, so that the same heat per unit of volume of composition may be formed in situ if desired.

Referring more particularly to the drawings, wherein like parts are designated by like numerals of reference throughout the several views, it will be seen that a tire casing 1, of any desired size, containing any suitable vulcanizable rubber-like composition such as natural or synthetic rubber vulcanizable with sulfur or by appropriate treatment and having a suitable air bag 2 disposed therein, is cured while disposed within a suitable forming mold 3. The curing is accomplished by the aid of high frequency energy supplied from a suitable source, such as a high frequency generator 5 between conductive layers or areas disposed on opposite sides of the tire casing.

The mold may be of metal which is longitudinally split to provide upper and lower halves 3a and 3b, which may cooperatively form a single rigid conductive surface to contact the outside of the tire casing. The mold halves 3a and 3b are preferably disposed in contact with suitable heating means, such as steam or other hot fluid, which may be supplied to cavities 6a and 6b formed by the respective halves 3a and 3b and respective upper and lower walls 7a and 7b of the watch case type heater 4, which serves a means for mounting or carrying the mold halves. The mold halves may be provided with conventional closing and opening mechanisms and are pivoted about the bolt 9 to permit separation thereof for extraction or insertion of the tire casing.

In accordance with one phase of the present invention, wherein heat is supplied to the bead-forming areas by the production of induced current therein, it is desirable to prevent metal-to-metal contact between the mold halves and the walls 7a and 7b. For this reason gaskets 11 and 12 may be provided between the mold halves and the metal members to which they are attached. Gaskets 13 may be provided between attaching bolts 14 and the mounting means to which the mold members are attached.

The air or fluid pressure bag 2 having means such as a tubular conduit 50 for supplying fluid pressure to the cavity thereof from the pipe 51, which may be connected to a source of air or separately insulated source of steam or water pressure or the like (not shown), comprises the combination of a stretchable conductive surface and a relatively non-conductive rubberlike material. The stretchable conductors or conductive surface preferably used may comprise a layer or area of relatively highly conductive, soft rubber composition in combination with a contacting metal conductor which may serve as means for making electrical connection with a substantial area of the conductive rubber composition. The conductive rubber composition serves to distribute the high or radio frequency electric field through the desired portion of the dielectric being cured.

The conductive, soft, vulcanized rubberlike compositions utilized in the present invention as potential distributors preferably have a resistance of 100 ohms/cm. cube or less; however, conductive, soft, rubber compositions having a resistance as high as 5,000 or 10,000 ohms/cm. cube or even more may be used, particularly in conjunction with relatively closely spaced metallic conductors or when the current used is low. Rubber compositions having a resistance greater than a megohms/cm. cube are not suitable for most applications unless used in conjunction with auxiliary metallic conductors as hereinafter described.

It is found that conductive rubberlike compositions, prepared by mixing with a rubberlike material the usual desired compounding ingredients and a substantial amount, say 20 to 50 or 60 parts per 100 parts of rubberlike material, of a carbon black having a structure such as that deposited from acetylene, are particularly effective for distribution of electrical potential. Such a black may be obtained commercially from Shawinigan Chemicals Limited. Other highly conductive, stretchable compositions such as those obtained by mixing large amounts of graphite into a vulcanizable rubberlike composition may also be used to obtain some of the advantages.

The rubberlike materials of the conductive compositions include natural rubber, polymers of one or more of butadiene, homologues or analogues thereof, Buna rubbers (copolymers having at least 50 parts of one or more conjugated dienes, such as butadiene and isoprene, and with one or more other copolymerizable unsaturated materials such for example as styrene, vinyl chloride, chlor-substituted styrenes, methyl methacrylates, acrylonitrile, dimethyl vinylethynylcarbinol, vinyl pyridine, vinylidene chloride, and others), neoprene, polysulfide condensation products with a di-substituted organic compound such for example as olefin polysulfides, including both the curable and non-curable types, which are available under the trade name Thiokol, as well as butyl rubbers (copolymerization products of a minor proportion of butadiene or other conjugated diene and isobutylene), rubbery condensation polymers such for example as rubbery condensation products of sebacic acid and ethylene glycol, curable vinylidene chloride copolymers or polymers, and any other rubbery elastomer that is curable or vulcanizable with sulfur or by other appropriate treatment (changeable by suitable treatment from the plastic to the elastic state). The compositions are usually utilized in the cured or vulcanized state.

Figure 10:
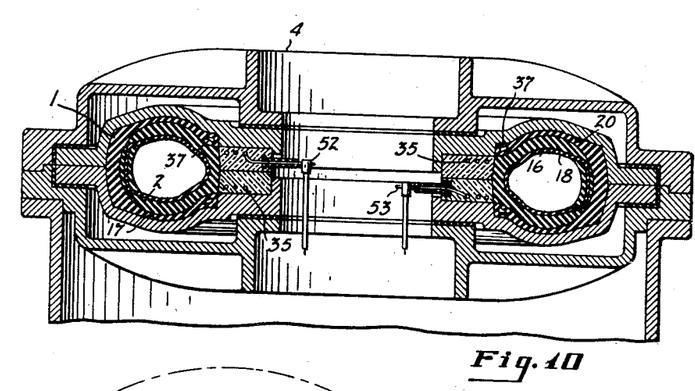
Fig. 10 is a sectional view through a mold embodying the present invention, showing means for making connection to induction bead heaters which may be used to supply heat to the substantial mass of metal within the beads of the tire casing.

In the modification shown in Figs. 1 to 4 inclusive, and Fig. 10, the conductive layer 16 is provided with an outer layer 18 of rubberlike material having varying thickness. The thickness of the rubberlike material 18 preferably varies inversely as the thickness of the tire cross section nearest thereto, so that the shortest distance from each portion of the outer surface of the conductive layer 16 to the nearest portion of the inner surface of the conductive surface 20 of the forming mold is about constant. Thus, since the side wall portions of pneumatic tires generally have a relatively thin cross sectional thickness, the thickness of the relatively non-conductive soft rubberlike material 18 of the air bag adjacent the tire side wall is preferably greatest. On the other hand, adjacent the shoulder portions of the tire the stretchable resilient conductors are preferably in contact with the surface.

By selecting a dielectric material of relatively lower power factor than has the composition of the tire being cured, some selectivity in the heating of the tire may be provided. If the material 18 has a lower dielectric constant, the thickness of the thicker portions thereof is preferably increased to obtain a uniform field. Since the field between various points of the conductive layer 16 and the portions of the surface 20 nearest thereto varies inversely as the square of the distance and only inversely as the first power of the dielectric constant, it is seen that tendency for an increased field by use of the composition 18 having a lower dielectric constant may be readily offset by a slight increase in thickness thereof.

Connecting means such as a metal lead 23 which may be connected to a terminal 25 of the high frequency generator 5 by a connecting wire 26 is provided for making electrical connection between the stretchable resilient conductive layer 16 and a high frequency source. The metal lead 23 is preferably disposed within suitable insulation 27, e. g., tubular insulators of porcelain, an evacuated co-axial chamber, rubber or other material to prevent the making of metal-to-metal contact between it and the mold or surfaces of different potential. The lead 23 preferably makes metal-to-metal contact with one or more auxiliary metal connectors, for example annular, flexible wire or cable 28 which is embedded in or lies in the conductive layer 16.

A grounded terminal 29 of potential intermediate those of terminals 25 and 30 of greatest potential difference, is attached through the wire 32 and the lead 33 carried within an insulator 34 to the rigid conductive surface such as the surface 20 of the mold disposed over the outside portions of the tire casing 1.

Figures 11, 12:
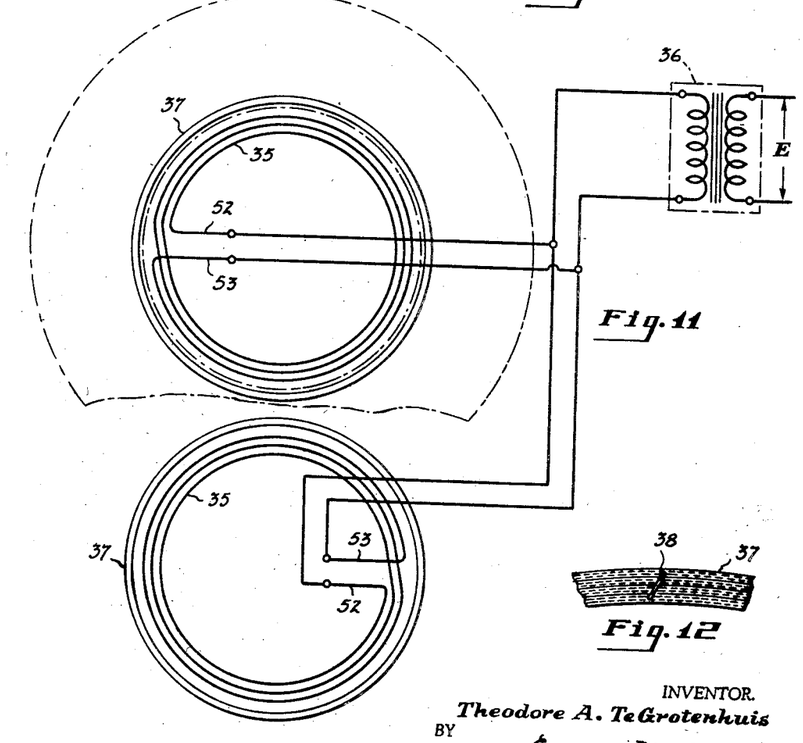
Fig. 11 is a schematic view showing the connection of the induction bead heating elements in the apparatus of Fig. 9 to a suitable source of low frequency alternating current supply.
Fig. 12 is an enlarged view of a portion of the tire bead showing a splice which may be present to join the ends of the wire together so as to make a complete circuit and thus facilitate induction heating.
Figure 13:
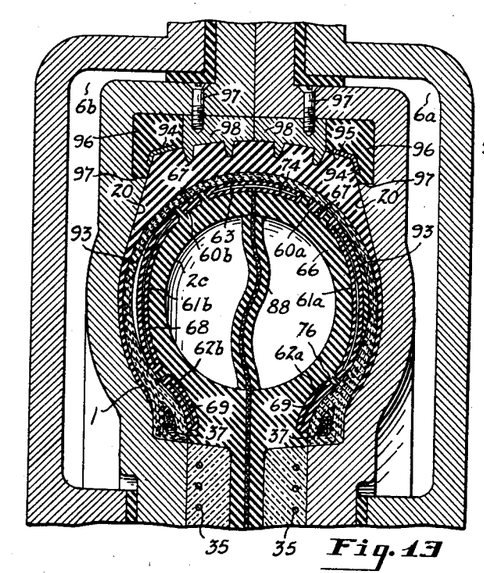
Fig. 13 is a sectional view through the preferred form of apparatus embodying the present invention showing a modified form of mold having disposed therein a tire casing containing a modified form of air bag.

Annular insulators, such as the rings 22 which are held within the inner peripheral portions of the mold halves 3a and 3b, are preferably provided to bear against the inner periphery of the air bag and to prevent shorting of the field. Inductive heating means, such as coils 35 disposed within the annular insulators 22 and connected in series relation as illustrated in Fig. 11 to a suitable transformer 36, or other suitable source of alternating current of relatively low or commercial frequency, are preferably provided for supplying heat to the mass of metal within beads 37 of the tire casing. The coils 35 are connected to provide superimposed magnetic fields having lines of force following the mold and entirely circumventing the cross section of the beads. The ends of the individual wires of the beads 37 are preferably connected together by suitable means, such as a splice 38 (Fig. 12), to provide a closed electrical circuit, or one or more closed loops of wire may be incorporated in the beads to serve as inductive heating means therefor.

To prevent substantial induced current in the mold halves 3a and 3b, transverse insulating means such as one or more transverse cuts or spaces filled with suitable insulation 40 are preferably provided. The insulation 40 may for example be porcelain or other hard non-conductive material. The mold portions 3a and 3b adjacent the ends 41 and 42 may be provided with suitable stiffening or connecting means, such as lugs 43 and 44 containing insulating collars which prevent metal-to-metal contact with the connecting bolt 46.

When a high frequency alternating potential having a frequency of substantially more than 100,000 cycles per second and preferably about 1,000,000 to 10,000,000 or more cycles per second and having a suitable potential preferably of several thousand volts, or sufficient to produce the required amount of strain in the dielectric material, is supplied from the suitable generator 5 between the stretchable conductors, such as the layer 16 and the conductive surface 20 of the mold, heat is produced in situ throughout the rubberlike material therebetween. Lower than 1000 volts may be used however.

Since the outer conductive surface of the layer 16 is closer to the inner surface 17 of the tire casing in the region of the shoulder thereof, the energy per unit of surface area dissipated internally of the shoulder region of the tire is greater and the heat formed in situ per unit volume of rubberlike material may be substantially the same as that in thinner portions of the tire. The heat supplied externally of the tire carcass from the steam or heating fluid within the cavity 6a is found to be desirable in smoothing out some of the variations due to any variation in intensity of the electric field.

Figure 1:
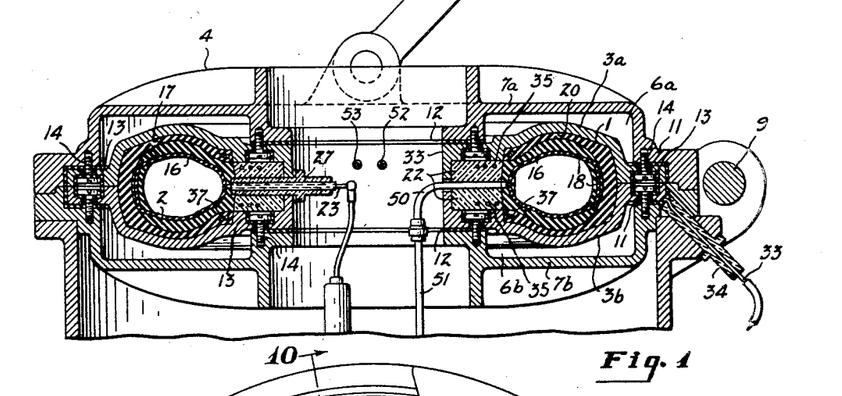
Fig. 1 is an elevational view, partly in section, of apparatus embodying the present invention and having a tire disposed therein as when subjected to my curing process.
Figure 2:
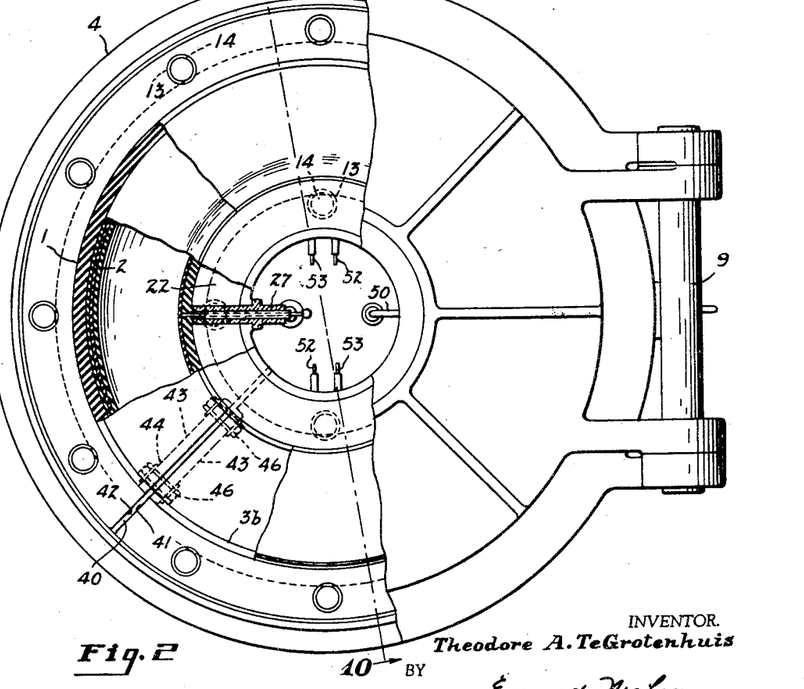
Fig. 2 is an elevational view, with parts broken away, of the apparatus shown in Fig. 1.
Figure 3:
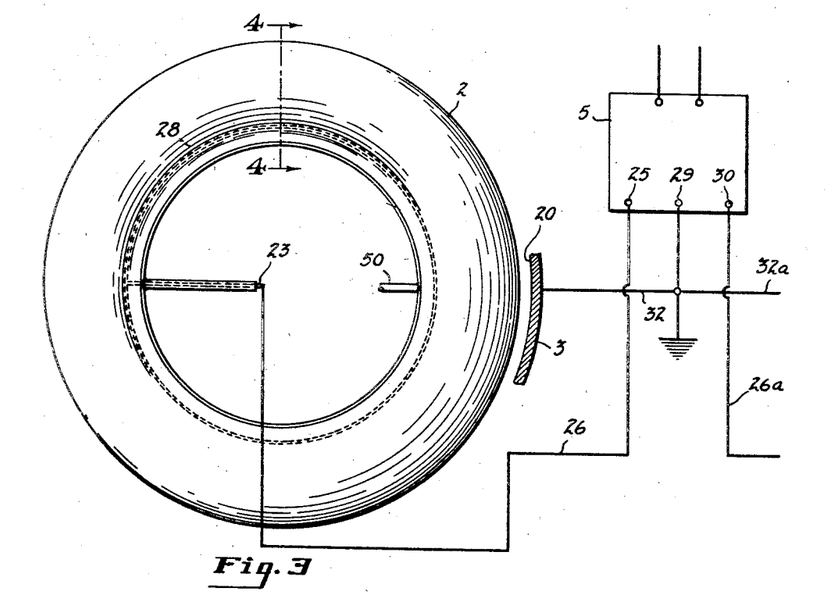
Fig. 3 is an elevational view of an air bag embodying the present invention, showing schematically electrical connections to a suitable high frequency generator and to a portion of a tire-forming mold.
Figure 4:
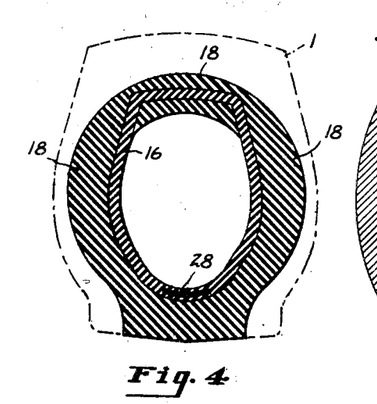
Fig. 4 is a sectional view on the line 4—4 of Fig. 3 showing in dotted lines the outline of a tire casing.
Figure 5:
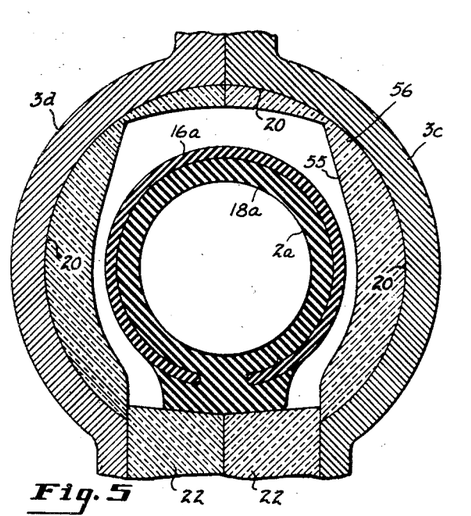
Fig. 5 is a sectional view through a modified form of apparatus embodying the present invention with a modified form of air bag in a tire casing which is disposed within a modified form of tire forming mold.
Figure 6:
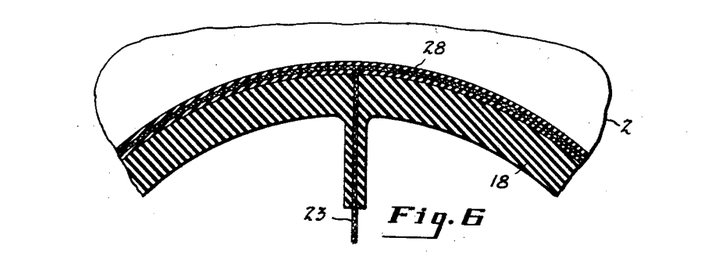
Fig. 6 is a fragmentary view of an air bag, with parts broken away to show means for making electrical connection.

In the modification shown in Fig. 5, the electrically conductive surface 20 of the rigid forming mold halves 3c and 3d is displaced at varying distances from the outer surface 55 of the tire casing by non-conductive rigid material 56, such for example as porcelain, Pyrex, glass, fused quartz, etc., the thickness of the non-conductive material 56 being greater where the thickness of the tire section is less.

The air bag 2a may be entirely of conductive rubber composition, with or without auxiliary metal conductors disposed therein, or it may have a stretchable conductive surface layer 16a with means for making electrical connection thereto carried by the non-conductive rubberlike composition 18a, the stretchable conductive material 16a preferably being an outer layer.

To provide selective heating of the tire casing, the rigid insulating material 56 may be selected so as to have a lower power factor than the composition of the tire. Each portion of the outer surface of the stretchable conductive layer is disposed with relation to the nearest portion of the rigid conductive surface 20, so that a field of desired uniformity may be had throughout the tire casing.

Figure 7:
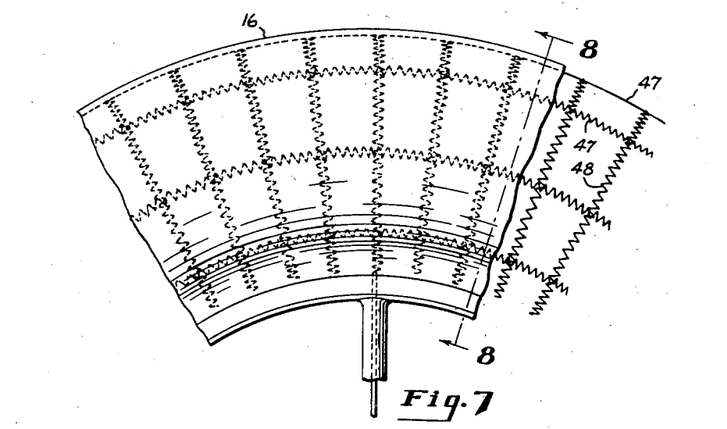
Fig. 7 is an elevational view of a portion of a modified form of air bag, with parts broken away to show stretchable metallic electrical conductors.
Figure 8:
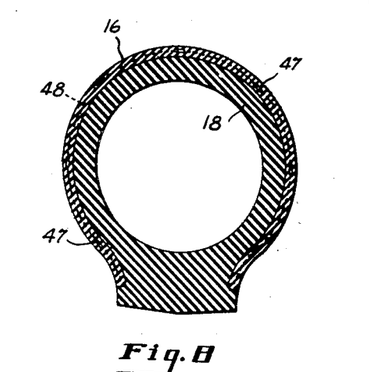
Fig. 8 is a sectional view on the line 8—8 of Fig. 7.
Figure 9:
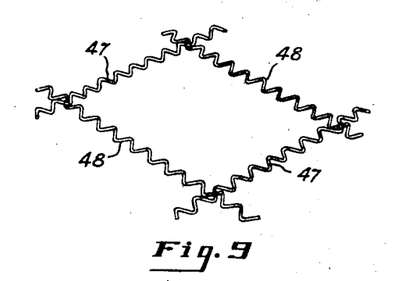
Fig. 9 is an enlarged perspective view of a portion of a meshwork of stretchable conductors that may be used.

As shown in Figs. 7 to 9, inclusive, the conductive layer is formed of a relatively closely spaced meshwork of stretchable metallic conductors 47 and 48. The conductors 47 and 48 may be embedded in conductive rubberlike material to distribute a potential more evenly over the desired area. If the distance between the metallic conductors is relatively small compared to the thickness of the tire, the conductive rubberlike composition may be eliminated and yet a reasonably effective distribution of potential obtained. By varying the spacing of the conductors 47 and 48 and by utilizing a conductive rubberlike composition, it is found, however, that a desired degree of the heating of the composition to just prevent energy dissipation from the contact surface of the tire may be obtained. Thus, by increasing the spacing between the conductors or by increasing the resistance of the conductive rubberlike composition, increased conductive heating of the surface layer 16 may be had, so that it is possible to prevent heat loss from the tire carcass to the air bag. The same effect is also had by supplying heat from an external source to the inner surface of the tire, or by heating the fluid pressure bag by heating fluid admitted to the cavity defined by the walls thereof.

In accordance with the preferred modification of the present invention, illustrated in Figs. 13 to 16, inclusive, at least one of the two conductive surfaces (the inner conductive surface of the mold or the conductive surface of the air bag) situated on opposite sides of the tire casing is divided into a plurality of separately insulated, annular conductive elements. Means is provided for selectively connecting one or more of said elements to a high frequency source or generator so that formation of heat in one or more selected portions of the tire casing may be had. Thus, the air or fluid pressure bag 2c within the tire casing 1 may be provided with a plurality of annular conductive elements, such for example as annular conductive elements 60a and 60b, 61a and 61b, 62a and 62b, and 63, and/or the inner surface of the mold may be provided with a plurality of separately insulated annular conductive elements, each with appropriate connecting means for selectively connecting it to a source of electrical energy.

The conductive elements 60 to 63 preferably comprise a conductive rubber composition as above set forth and auxiliary metallic conductors 67 to 69, inclusive, and 74, although either separately insulated, spaced, annular, flexible metallic conductors covering the desired areas or the conductive rubber composition having suitable means for making electrical contact thereto may be used alone to obtain a portion of the benefits of the present process. The annular conductive elements 60 to 63, which when only a few are used preferably have substantial surface parallel to the inner surface of the tire, are preferably attached to or carried by a base 66 of suitable stretchable non-conductive rubberlike material which may serve as the walls of the bag acting as means for retaining the desired fluid pressure within the cavity thereof and as means for positioning and insulating the conductive elements from each other. If however, the inner conducting surface of the mold is divided into a plurality of spaced, separately insulated conductive surfaces or wires, as set forth above, the fluid pressure bag may be constructed substantially entirely of conductive vulcanized rubber composition. In either case, since the tire casing is symmetrical about the longitudinal center line, the annular, separately insulated conductive elements may be disposed and connected in pairs symmetrical about the longitudinal center line of the tire.

Thus, in the fluid pressure bag, the conductors 60a and 60b, which are preferably relatively narrow and which are disposed adjacent the shoulder regions of the tire, may be connected together in pairs through a lead 70, which in turn is connected through the lead 71 and a terminal 72 to a terminal 82 of a selector switch which is connected to the wire 73 and which permits selective connection to the terminal 25 of the radio frequency generator 5.

The flexible conductors 61a and 61b are so disposed as to have substantial areas adjacent the side wall portions of the tire and insulated from the conductors 60 and 62 by annular strips 75 and 76 of rubberlike material. The conductors 61a and 61b may be connected together through a lead 77 which is connected through a wire 79 and a terminal 80 to a terminal 81 of another separately operable switch also connected to wire 73.

The annular conductors 62a and 62b disposed in the air bag so as to be adjacent the bead regions of the tire may be connected together through a lead 84 to a wire 85 attached to a terminal 86, which is connected to a terminal 87 of another separately operable switch connected to wire 73.

The annular conductive element 63, disposed adjacent the crown region of the tire and symmetrical with the longitudinal center line thereof, is connected through a conductor 88 to a terminal 89, which is connected to a terminal 90 of another switch connected to wire 73.

Figure 14:
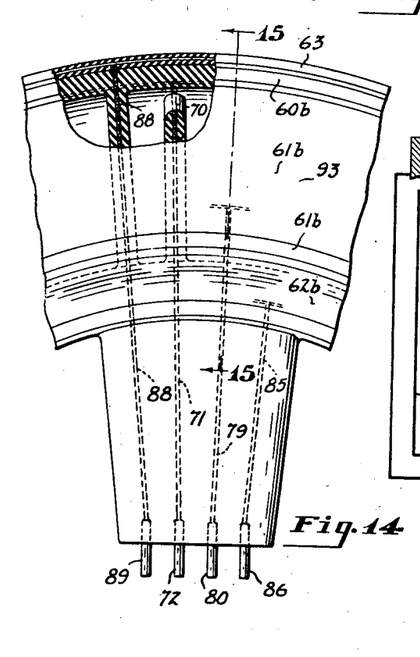
Fig. 14 is an elevational view with a part broken away of a portion of the preferred form of air bag shown in Fig. 13 showing one way of attaching conductive leads to the separately insulated annular stretchable electrical conducting surface portions thereof.
Figure 15:
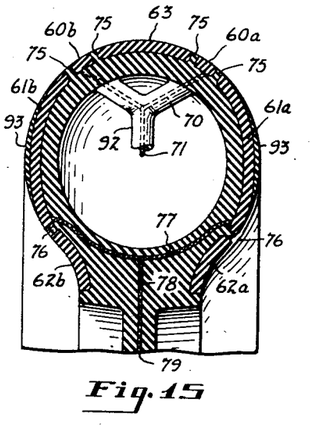
Fig. 15 is a sectional view, taken on the line 15—15 of Fig. 14.
Figure 16:
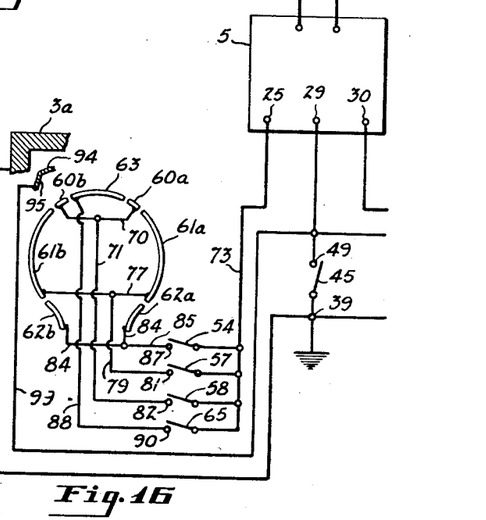
Fig. 16 is a schematic view showing the arrangement of the conductive elements of the air bag with relation to the conductive surfaces of the mold and diagrammatically showing suitable connections for selectively connecting the conductive surfaces to the high frequency generator to provide the desired amount of energy for different portions of the tire.

Although in Fig. 14 for purposes of illustration connecting terminals are disposed in relatively close proximity it is preferred that terminals 72, 80, 86 and 89, as well as the connecting wires 71, 79, 85 and 88 be disposed substantial distances from each other so that widely distributed portions of the tire and of the air bag are subjected to fields due to energy carried by the connecting wires themselves.

Leads 70, 71, 77, 79, 84, 88, etc., are preferably of highly flexible material high surface area such as coiled stranded metal disposed within a suitable matrix of non-conductive rubberlike material. To prevent undue curing of different portions of the tire, the leads are preferably disposed as far as possible from the conductive surfaces of the mold. Thus, the leads 70, 71, etc., are preferably disposed within a tube or matrix 92 of rubberlike material and the length of the coiled conductor is preferably sufficient to permit stretching of the air bag and insertion in the tire band during expansion thereof without tending to cause separation of connections.

By providing a layer 93 of non-conductive rubber-like material over the outer surface of the conductive layers 61a and 61b in the side wall thereof opposite the thinner portions of the tire side wall the conductive layer 61 may be of relatively greater width without producing a field of too high intensity and without unduly heating the thinner portions of the tire. However, by increasing the number of separately insulated annular conductive elements and by decreasing the width thereof, a relatively even cure may be had when the entire outer surface of the conductive elements bears against the tire casing.

While it is preferred that the conductive elements be flexible and stretchable, since they are carried by flexible material, some, e. g., 60, 61, 62, etc., may even be flexible and non-stretchable, in which case these are subjected only to sidewise movement from the longitudinal center line of the tire casing. The number of and the spacing of the annular conductive elements may be varied as desired, a larger number of relatively thin or narrow separately insulated annular elements giving greater selective control of the field and degree of heating in portions of the tire than do a smaller number. When heat is also applied externally of the tire casing, a substantial proportion of the benefits of the present invention may be obtained when conductors are only disposed opposite the thicker regions of the tire. Thus, by the use of conductors 60a and 60b only, so that heat is generated in situ only within the shoulder portions of the tire, substantial reduction in curing time may be obtained.

To increase the intensity and control of the field in the shoulder portions of the tire, it is often desirable to provide annular conductors having an annular conductive surface 95 of relatively small cross sectional extent adjacent the shoulder portions of the tire and electrically insulated from the conductive surface 20, which bears against the outer side walls of the tire by suitable insulation 96, such as porcelain or other rigid insulating material, which is retained within the mold halves by the shoulder 97 and the removable annular tread-forming annular segments 98.

The conductive surface of the annular separately insulated portion 94 of the mold is preferably connected through a wire 99 to the center terminal 29 of the generator 5 in such a way that a separate high frequency potential difference may be selectively applied between one or more annular elements, such as 60a, of the air bag and the portion 94. This is readily permitted by connecting the mold half 3a which makes electrical contact with the surface 20 to a grounded terminal 39 of a switch 45, the other terminal 49 being connected to the center terminal 29 of the high frequency source 5.

In the curing of tires in accordance with the apparatus illustrated in Figs. 13 to 16, inclusive, the electric field may be specifically directed to the shoulder regions by closing a switch 58 and opening the switch 45. After a short treatment, the switch 45 may then be closed and switches 45, 54 and 65 may then be closed in any desired order to also subject the dielectric material of the next thicker region of the tire to rapid change in strain and thus form heat in situ therein. Since the side wall of the tire is generally relatively thin, it is preferred that switch 57 be closed for a relatively short period of time, and if heat is supplied externally sufficient heating may be had without closing it at all.

It is thus seen that a plurality of annular conductive segments of relatively limited area at one or both surfaces, each segment or each pair of segments having separately insulated connecting means, permits the utilization of any of the desired amount of energy within the respective portions of the tire. Since appreciable amounts of non-conductive insulating material need not also be disposed in an electric field, it is seen that greater efficiency of utilization of the high frequency energy is had.

By combining the heat formed in situ with energy applied to one or both external surfaces from steam or heating fluid admitted to the cavities 6a and 6b, the effects of even slight variations in the electric field may be eliminated. The extra heat required for the metal of the beads may, as above set forth, be inductively supplied by passing current through the coils 35 having terminals 52 and 53 connected to the transformer 36 that is connected to a suitable source of electrical energy E. If desired, heat may be magnetically or electrically induced within the bead wires as by passing a current of intermediate frequency, say 1000 to 200,000 cycles per second through a coil having windings enclosing only a portion of the two beads (circumventing the tire cross section) and rotating the beads longitudinally through the coil.

The heat formed throughout a tire of given composition depends, as stated before, on the intensity of the electric field and its rate of change. It is increased by increasing the potential difference between the oppositely disposed electrodes and by increasing frequency. The particular frequency used and the particular potential applied may be varied, as desired. To obtain the same curing time in tires of greater cross section, a higher potential or higher frequency, or both, may be used.

Voltages of the order of one thousand to twenty-five or thirty thousand volts, or even more, are desirable in tires having relatively thick sections. In tires having relatively thin sections, such as passenger car tires, smaller voltages may be used.

Since the heat is formed in situ throughout the tire in accordance with the present invention, and since the interior portions of the tire may be subjected to the same temperature for the same length of time as are the surface regions of the tire, fast or ultra accelerators may be used to cause curing of the tire in but a small fraction of the time required heretofore. In fact, the curing time of heavy duty tires having high cross sectional thickness may be reduced from the two or three hours heretofore required, to as little as one-fourth hour by the selection of faster curing accelerators and by the application of the present invention.

It is to be understood that variations and modifications of the specific process and apparatus herein shown and described for purposes of illustration may be made without departing from the spirit of the invention.

What I claim is:

1. In a method of curing a pneumatic tire wherein said tire is formed and cured between a rigid forming surface of a mold and a fluid-pressure bag connected to a source of fluid pressure, the steps which comprise passing high frequency electrical potential between selected portions of said mold and of said fluid-pressure bag to subject said selected portions of said tire to a high frequency electric field to form heat in situ therein, and applying external heat by conduction to the inner and outer surfaces of the tire to equalize by heat migration the temperature throughout the tire.

2. In a method of curing a pneumatic tire wherein said tire is formed and cured between a rigid forming surface of a mold and a fluid-pressure bag connected to a source of fluid pressure, the steps which comprise pressing said tire between a rigid forming surface of a mold, which is adapted to bear against external surfaces of said tire casing, and an air bag adapted to bear against the internal surface of said tire casing and having a plurality of annular conductive elements, some of which are insulated from each other, and impressing a high frequency electrical potential difference between an inner conductive surface of said mold and selected of said elements to subject selected portions of said tire only to a strong high frequency electric field so as to cause formation of heat in situ therein and also applying heat by conduction from an external source to the inner and outer surfaces of the tire to cause equalization of the curing in different portions of the tire.

3. In a method of making a pneumatic tire the steps which comprise disposing a tire between a rigid forming surface of a mold and flexible, stretchable, conductive rubberlike material carried by an air bag internally of said tire, applying fluid pressure to the cavity of said air bag to force said tire strongly against said mold, and while maintaining such pressure applying a high frequency electrical potential difference between said conductive rubberlike material and selected portions of said tire to form heat in situ therein and applying heat by conduction from a source of substantially uniform temperature and externally of the tire to cause by diffusion evening of heat in the different portions of the tire.

4. In a method of making a pneumatic tire, the steps which comprise pressing the tire to be cured between the inner rigid surface of a fluid heated mold and a soft vulcanized rubberlike composition, passing a high frequency electric field for different times through different selected annular portions of said tire, permitting heat to flow from said mold and from said selected annular portions of said tire to other portions of said tire to equalize by conduction internal temperatures within said tire and allowing said tire to remain in the mold until substantially cured.

5. In a method of curing pneumatic tires wherein the tire is placed in a mold and with the aid of heat and with the aid of pressure cured in the form of a mold, the steps which comprise applying a high frequency field between a conductor of limited area relative to said tire and disposed on one side of the tire and another conductor disposed on the other side of said tire, whereby said field is caused to strongly penetrate a limited area of the material of said tire to provide a source of heat of limited extent within said tire, applying a field to another pair of electrodes, at least one of which is spaced from an electrode of the first pair and on the same side of the tire thereof to cause a different portion of said tire to be subjected to a relatively strong electric field, said dielectrically heated portions being spaced from each other by a lesser distance than the thickness of the tire whereby a plurality of spaced dielectrically heated portions are formed in said tire and heat is supplied by conduction to points intermediately thereof.

6. In a method of making a pneumatic tire, the steps which comprise pressing the material of the tire to be cured between the inner rigid surface of a mold and a soft, vulcanized rubberlike composition, passing a high frequency electric field through selected portions of said material to form heat in situ therein, regulating the intensity and duration of such high frequency field through selected portions of said tire to initially heat said selected portions to a higher temperature than the temperature of other portions, and by conduction from said selected portions and from a source external of the tire heating the remainder of the tire to a vulcanizing range.

7. In a method of making a pneumatic tire, the steps which comprise pressing the material of the tire to be cured between the inner rigid surface of a mold and a fluid pressure bag, intermittently passing a greater concentration of a high frequency electric field through selected portions of the tread region of the tire than through other portions to raise the initial temperature of certain annular regions above that of other annular regions by heat formed in situ therein, raising the temperature to a vulcanizing range of other annular regions by conduction from said certain annular regions and from external heat applied to the surface of the tire by conduction from a source of substantially uniform temperature, whereby the path for conductive heat is shortened to portions of the tire and the time required for raising the tire to a curing temperature is reduced.

8. In a method of making a pneumatic tire wherein the tire is cured in a mold with the aid of heat and with the aid of pressure supplied by fluid through a rubberlike fluid pressure bag, the steps which comprise passing a high frequency electrostatic field through spaced portions of said tire and of said fluid pressure bag to form a plurality of internal annular portions heated by said field, and heating portions between said heated portions by conduction from said spaced portions and from a heat source external of said tire, whereby a relatively even temperature and even cure is had throughout the flexible portions of said tire.

9. In a method of making a pneumatic tire wherein the tire is cured in a mold with the aid of heat and pressure, the steps which comprise applying a high frequency field between a pair of annular conductors, one of which is disposed on one side of said tire and another of which is disposed on another side of the tire in the region of the tread thereof to cause heating of a localized area, shifting said field so that it is applied between a different pair of oppositely disposed, spaced annular conductors, at least one of which is laterally spaced from the conductor of the first pair to cause relatively localized internal heating of a different annular portion of said tire, and by conduction heating intermediate portions of said tire.

10. In a method of curing a pneumatic tire wherein the pneumatic tire is encased by a mold, the steps which comprise initially heating selected internal portions of said tire to a higher temperature than other portions of said tire by passing a high frequency electrostatic field through said portions of said tire while encased within the mold and applying external heat by conduction to at least one surface of the tire, whereupon said selected portions act as sources of heat energy to heat portions at lower temperature and said external heat acts to equalize the temperature throughout the tire, so that a curing temperature is obtained throughout the tire in a substantially shorter time than is required by said external heating alone.

11. The method of claim 10 wherein said selected portions are within the tread portion of the tire and wherein the electrostatic field is applied for only a portion of the time of cure.

12. In a method of curing a pneumatic tire wherein the pneumatic tire is disposed in a mold and pressed against the surface thereof by fluid pressure, the step which comprises passing a high frequency electric field through spaced portions of said tire to heat said spaced portions of said tire at least momentarily above portions of said tire adjacent thereto to provide a source of heat for said portions adjacent thereto of shorter path than the distance from the external surface of the tire, and applying an external temperature of substantially the curing range to an external surface of the tire to cause more uniform distribution of heat through the tire by migration.

13. In a method of curing a pneumatic tire wherein the pneumatic tire is disposed in a mold and pressed against the surface thereof by fluid pressure, the step which comprises passing a high frequency electric field intermittently through spaced portions of said tire to heat said spaced portions of said tire at least momentarily above portions of said tire adjacent thereto to provide a source of heat for said portions adjacent thereto of shorter path than the distance from the external surface of the tire, and applying an external temperature of substantially the curing range to an external surface of the tire to cause more uniform distribution of heat through the tire by migration.

14. The method of claim 13 wherein said selected portions are in the tread region of the tire.

15. The method of claim 13 wherein the electrostatic field is applied to different selected portions of the tire within the tread region for different periods of time.

16. The method of claim 12 wherein the external heat is applied by conduction to both the inner and outer surfaces of the tire to equalize the temperature therein by heat migration.

17. In a method of making a pneumatic tire wherein the tire is cured in a mold with the aid of heat and pressure, the steps which comprise concentrating a high frequency field through only a portion of said tire to cause portions of said tire to be heated in situ above other portions, and applying external heat to the whole body of said tire to heat other portions of said tire by conduction both from portions heated in situ by said high frequency field and from an external source whereby the main conductive heat path is shortened and curing time reduced.

18. In a method of curing a pneumatic tire wherein the tire is cured with the aid of heat and pressure, the steps which comprise concentrating a high frequency field through only portions of a tire in the region of the tread thereof to cause heating of a localized area, shifting said field so that it is concentrated through different portions of a tire to heat a different localized area, and by conduction heating intermediate portions of said tire.

19. In a method of curing a pneumatic tire wherein the tire is cured with the aid of heat and pressure, the steps which comprise concentrating a greater portion of a high frequency field through only portions of a tire in the region of the tread thereof to provide a source of heat of limited extent within said tire, applying another concentration of high frequency field to another portion of the tire spaced from the first concentration of field to a source of heat of limited extent within a different portion of said tire, said heated portions being spaced from each other, whereby a plurality of spaced dielectrically heated portions are formed in said tire and heat is conducted to points intermediate thereof to bring such points to a vulcanizing temperature.

THEODORE A. TE GROTENHUIS.

REFERENCES CITED

The following references are of record in the file of this patent:

UNITED STATES PATENTS

| Number | Name | Date |
|---|---|---|
| 2,198,493 | Freeman | Apr. 23, 1940 |
| 2,199,000 | Johnson | Apr. 30, 1940 |
| 1,923,736 | Lewis et al. | Aug. 22, 1933 |
| 1,605,683 | Meyer et al. | Nov. 2, 1926 |
| 2,280,771 | Dufour et al. | Apr. 28, 1942 |
| 2,321,131 | Crandle | June 8, 1943 |
| 1,932,692 | Fetter | Oct. 31, 1933 |
| 2,046,372 | Engstrom | July 7, 1936 |
| 2,363,508 | Doster et al. | Nov. 28, 1944 |
| 2,388,824 | Brown | Nov. 13, 1945 |